United States Patent
Parshin et al.

(10) Patent No.: US 9,588,848 B2
(45) Date of Patent: Mar. 7, 2017

(54) SYSTEM AND METHOD OF RESTORING MODIFIED DATA

(71) Applicant: Kaspersky Lab ZAO, Moscow (RU)

(72) Inventors: Yury G. Parshin, Moscow (RU);
Alexander A. Romanenko, Moscow (RU); Yuri G. Slobodyanuk, Moscow (RU)

(73) Assignee: AO Kaspersky Lab, Moscow (RU)

( * ) Notice: Subject to any disclaimer, the term of this patent is extended or adjusted under 35 U.S.C. 154(b) by 0 days.

(21) Appl. No.: 14/744,570

(22) Filed: Jun. 19, 2015

(65) Prior Publication Data

US 2016/0371152 A1  Dec. 22, 2016

(51) Int. Cl.
| | | |
|---|---|---|
| *G06F 11/14* | (2006.01) | |
| *G06F 21/55* | (2013.01) | |
| *G06F 21/56* | (2013.01) | |
| *G06F 21/54* | (2013.01) | |

(52) U.S. Cl.
CPC .......... *G06F 11/1458* (2013.01); *G06F 21/54* (2013.01); *G06F 21/554* (2013.01); *G06F 21/566* (2013.01); *G06F 21/568* (2013.01); *G06F 2221/033* (2013.01)

(58) Field of Classification Search
CPC ........ G06F 21/53; G06F 21/56; G06F 21/563; G06F 21/564; G06F 21/566; G06F 21/568; G06F 21/60; G06F 11/1458; G06F 21/554; G06F 2221/033
USPC ...................................................... 726/22–25
See application file for complete search history.

(56) References Cited

U.S. PATENT DOCUMENTS

| | | | |
|---|---|---|---|
| 7,472,420 B1 * | 12/2008 | Pavlyushchik | ......... G06F 21/55 707/999.2 |
| 7,716,743 B2 | 5/2010 | Costea et al. | |
| 8,104,090 B1 * | 1/2012 | Pavlyushchik | ......... G06F 21/55 726/24 |
| 8,499,349 B1 * | 7/2013 | Cruz | .................... G06F 21/568 726/24 |
| 9,069,955 B2 * | 6/2015 | Dolph | ..................... G06F 21/64 |
| 2003/0159070 A1 * | 8/2003 | Mayer | ..................... G06F 21/53 726/22 |
| 2005/0267916 A1 | 12/2005 | Tone et al. | |

(Continued)

OTHER PUBLICATIONS

Anonymous: "Using different types of storage snapshot technologies for data protection", Mar. 1, 2011 (Mar. 1, 2011), XP055218030, Retrieved from the Internet: URL:http://searchdatabackup.techtarget.com /tip/Using-different-types-of-storage-snapshot-technologies-for-data-protection [retrieved on Oct. 2, 2015].

(Continued)

*Primary Examiner* — Shanto M Abedin
(74) *Attorney, Agent, or Firm* — Arent Fox LLP; Michael Fainberg

(57) ABSTRACT

Disclosed is a system and method for restoring modified data. An example method includes intercepting, by an activity tracking module, a request from a program to modify data; determining, by an analysis module, parameters of the intercepted request; generating, by the analysis module, a request to generate a backup copy of the data based on at least one of the determined parameters of the intercepted request; and generating and storing, by a backup module, the backup copy of the data in an electronic database.

20 Claims, 3 Drawing Sheets

(56) References Cited

U.S. PATENT DOCUMENTS

| | | | |
|---|---|---|---|
| 2007/0180525 A1* | 8/2007 | Bagnall | G06Q 10/10 726/23 |
| 2009/0077664 A1* | 3/2009 | Hsu | G06F 21/566 726/24 |
| 2011/0219201 A1 | 9/2011 | Ranade | |
| 2013/0139264 A1* | 5/2013 | Brinkley | G06F 21/566 726/24 |
| 2013/0174257 A1* | 7/2013 | Zhou | H04L 63/1416 726/23 |
| 2013/0247193 A1* | 9/2013 | Zaitsev | G06F 21/568 726/23 |
| 2014/0325616 A1 | 10/2014 | Dolph et al. | |

OTHER PUBLICATIONS

International Search Report dated Oct. 6, 2015.

\* cited by examiner

SYSTEM AND METHOD OF RESTORING MODIFIED DATA

FIELD OF TECHNOLOGY

The present disclosure relates generally to the field of antivirus technologies, and, more particularly, to systems and methods of restoring modified data.

BACKGROUND

The rapid development of computer technologies in recent years and the widespread popularity of various computing devices (e.g., personal computers, notebooks, tablets, smartphones, and the like), have been a powerful stimulus to the use of these devices in various spheres of activity and to use these devices for a huge number of tasks (e.g., from the processing and storing of personal photographs to bank transfers and electronic document circulation). In conjunction with the growth in the number of computing devices and the software operating on these devices, the number of malicious programs has also grown at a significant rate.

Currently, there are a vast number of varieties of malicious applications, the overwhelming majority of which are designed to profit their designers. Some of the malicious applications steal personal and confidential data from the devices of users, including, for example, logins and passwords, banking information, electronic documents, and so on. Other malicious programs form so-called "botnets" from user devices for attacks (such as DDOS or brute-force) on other computers or computer networks. Still other malicious programs provide users with paid content through intrusive advertising, paid subscriptions, the sending of short message services to premium rate numbers, and so on.

One particularly troublesome variety of malicious programs is ransoms or ransomware. Once these types of programs are installed on user devices, they disrupt the device's functionality, for example, by blocking the data entry devices, damaging data, limiting access to interface elements, and the like. Afterwards, the programs demand payment for eliminating the negative consequences of their operation. The most dangerous of the ransom programs are cryptors, whose malicious activity includes damaging data of value to the user (e.g., databases, Microsoft Office® documents, photographs, video clips, and the like). The damaging of data occurs by the program's encrypting, renaming or hiding of files.

Since not only the confidentiality of data, but also the data's integrity often represents a great value, the protection of data is an important task. One method for handling the ransom threats is the timely detection of the malicious application on the user device and its subsequent deactivation, making it possible to protect the data from unauthorized modification, as well as a regular creation of backup copies of data, which makes possible a restoration of the data even in the event of an unauthorized modification thereof.

Although the aforementioned methods are well suited for the tasks of tracking of file activity, backup storage of user data, and blocking the working of malicious software, these methods are not able to protect valid user data from modification by malicious software, since they are not able to effectively make a decision on backup data copying (i.e., in sufficient time before the data modification has been initiated), or in the case of a successful backup copying of data that can be modified, the methods are not able to assess the level of threat to this data from a modifying process. This, in turn, leads to a significant load on computer resources, including free hard disk space, processor time, and the like.

SUMMARY

Accordingly, the method and system described herein provides an effective and efficient way of restoring modified data.

According to one aspect, a method includes intercepting, by an activity tracking module, a request from a program to modify data; determining, by an analysis module, parameters of the intercepted request; generating, by the analysis module, a request to generate a backup copy of the data based on at least one of the determined parameters of the intercepted request; and generating and storing, by a backup module, the backup copy of the data in an electronic database.

According to another aspect, the parameters of the intercepted request comprise at least one of a unique data identifier of the intercepted request, a method of operating with the data, at least one type of operations for the data, and at least one data modification parameters.

According to another aspect, the method includes determining process parameters of a process of the program that modify the data; analyzing the determined process parameters; and blocking further operation of the process of the program based on an analysis of the process parameters.

According to another aspect, the method further includes determining if the data has been modified by the process of a malicious program; and if the data has been modified by the process of the malicious program, restoring the data using the backup copy of the data after the further operation of the process of the malicious program has been blocked.

According to another aspect, the analyzing of the determined process parameters comprises determining a threat level of the process parameters of the process of the program to modify the data and blocking the further operation of the process of the program based on the threat level.

According to another aspect, the blocking of the further operation of the process of the program comprises at least one of deleting the process from memory of the device, halting execution of the process, and placing a file running the process in quarantine.

According to another aspect, the method further includes analyzing, by the analysis module, the parameters of the intercepted request according to rules including at least one of a need to backup the data based on a type of the data, of which the request from the program is to modify, whether the request from the program will modify user operations of the data, whether the request from the program will modify the data based on types of operations available for the data, and whether the data will be modified when the data is written to a file.

According to one aspect, a system is disclosed for restoring modified data. According to this aspect, the system includes an activity tracking module configured to intercept a request from a program to modify data; an analysis module configured to determine parameters of the intercepted request and to generate a request to generate a backup copy of the data based on at least one of the determined parameters of the intercepted request; and a backup module configured to generate the backup copy of the data and store the backup copy of the data in an electronic database.

According to one aspect, a non-transitory computer readable medium storing computer executable instructions is disclosed for restoring modified data. According to this aspect, the instructions are provided for intercepting, by an activity tracking module, a request from a program to modify the data; determining, by an analysis module, parameters of the intercepted request; generating, by the analysis module, a request to generate a backup copy of the data based on at least one of the determined parameters of the intercepted request; and generating and storing, by a backup module, the backup copy of the data in an electronic database.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Example aspects are described herein in the context of a system, method and computer program product for restoring modified data. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
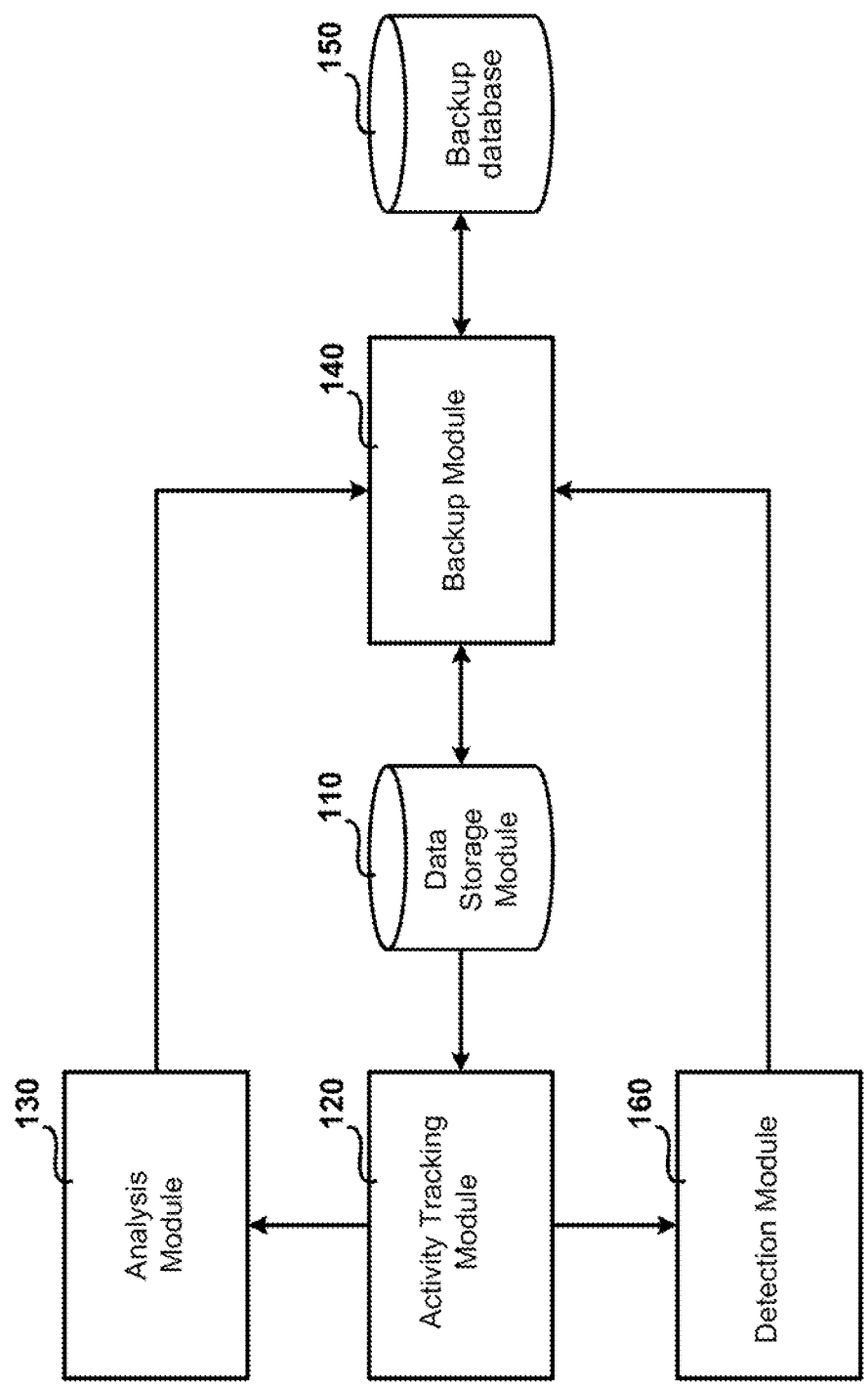
FIG. 1 illustrates a block diagram of an example system for restoring modified data according to an exemplary aspect.

FIG. 1 illustrates a block diagram of an example system for restoring modified data according to an exemplary aspect. As shown, the system for restoring modified data includes a data storage module 110, an activity tracking module 120, an analysis module 130, a backup module 140, a backup database 150 and a detection module 160.

In one example aspect, the data storage module 110 is configured to receive data from a process, store the data, and provide the data on demand of the process. The data storage module 110 may be, for example, a file manager for operating with the file system and/or a memory manager for operating with the main memory. The data provided by the data storage module 110 may be files and/or memory areas.

In one example aspect, the activity tracking module 120 is configured to intercept requests from the process to the data storage module 110 that may modify the data stored there, determine the parameters of the process and send these parameters to the detection module 160. The activity tracking module may also determine the parameters of the intercepted requests and send them to the analysis module 130.

In one example aspect, the intercepting of requests from the process to the data storage module 110 can occur via intercepting of application program interface ("API") function calls by replacing the address of the present function, direct changing of functions (e.g., by splicing, kernel mode interception with modification of the body of the function), or by directly replacing an entire component of the application/system.

In one example aspect, the requests of the process to the data storage module 110 can include, for example, API functions of the operating system (such as the WinAPI functions for Microsoft Windows®) and/or functions of the operating system kernel. The parameters of the intercepted requests can be, for example, (i) a unique data identifier (e.g., a file descriptor or the path to the file, an address of the memory being modified, and the like); (ii) a method of operating with the data (e.g., reading, overwriting, deletion of data, and the like); (iii) types of operations with the data (e.g., writing a buffer into a memory area occupied by data, reading a file header, and the like); and (iv) data modification parameters (e.g., the size and content of the buffer being written into the memory area, new access rights to the file being modified, and the like). Moreover, the process parameters can be, for example, the path to the application running the process; the process descriptor; and/or the log of operations executed by the process.

In one example aspect, the analysis module 130 is configured to create and send to the backup module 140 a request for backup copying to the backup database 150 of the data that may be modified by the process on the basis of the results of the analysis of the parameters of these requests based on certain rules, for example. In one example aspect, the rules used for analysis of the parameters of the intercepted requests may be:

a rule determining the need for further backup copying of data according to the type of data which the request is meant to be working with (e.g., if the data integrity is important to the working of the operating system (as in the case of executable files *.exe, *.dll and so on) or to the user (as in the case of databases, Microsoft Office® documents, email files, images, and so on);

a rule determining whether the operation may result in a modification of data according to the method of operating with the data (e.g., opening a file with write privileges);

a rule determining whether operations can result in a modification of data according to the type of operations on the data (e.g., writing a data buffer to a file); and a rule determining whether a modification of data will be performed or whether data will not be affected in regard to the data being written (e.g., appending to a video stream file).

In one example aspect, the backup module 140 is configured to perform a backup copying of data from the data storage module 110 to the backup database 150 in response to a request of the analysis module 130. The backup module 140 is further configured to restore data from the backup database 150 to the data storage module 110 on request of the detection module 160. The backup database 150 is also designed to save the data transferred by the backup module 140 and provide it to the backup module 140.

In one example aspect, the detection module 160 is configured to analyze the process parameters received from the activity tracking module 120 to determine the threat level of the process to the integrity of the data being modified by it with the help of rules. The detection module 160 is configured to form and send to the backup module 140 a request to restore, from the backup database 150 to the data storage module 110, data modified by the process on the basis of the results of the analysis performed, and to block the working of the process on the basis of the results of the analysis performed.

In one example aspect, a rule for determining the threat level of the process to the integrity of the data being modified can be the possibility of irretrievable loss of the data being modified by the process, and, more specifically, encryption of data with no possibility of its decryption (e.g., due to inability to obtain the necessary decryption key); overwriting of data (i.e., writing of new data for old data with no possibility of restoring the latter), the deletion of data, and the like. The process can be blocked by deleting the process from the memory, halting the execution of the process, placing the file which runs the process in quarantine, and the like.

To further describe the example system and method, the following example is provided to describe the operation of the system of restoring modified data for Microsoft Office® documents (e.g., "*.docx", "*.xlsx" and the like) after they have been encrypted by a cryptor program. As described above, the cryptor program is malicious software that encrypts the user's files, such as databases, Microsoft Office® documents, photographs, video, and the like, and provides an offer to the user to decrypt them using a paid decryptor program.

In one example aspect, the cryptor program searches the hard disks of an infected computer for Microsoft Office® files, after which it encrypts them and renames them (e.g., the program changes the extensions *.docx to *.docx_crypted, in order to find and decrypt only previously encrypted files afterwards). When the cryptor program accesses the data storage module 110, which may be a file manager of the operating system, with a request to gain access to a Microsoft Office® document file in order to make changes, it performs a call of the WinAPI functions "::CreateFile", "::WriteFile" and "::MoveFile". In an exemplary aspect, the activity tracking module 120 intercepts these requests and determines their parameters, i.e., the unique identifier of the file being accessed, which operations it is preparing to perform on the file, and the like. The activity tracking module 120 sends the information received to the analysis module 130. The activity tracking module 120 also intercepts the parameters of the process of the cryptor program, such as the process identifier, the log of operations executed by the process, and the like, and sends the intercepted parameters to the detection module 160.

In one example aspect, the analysis module 130, on the basis of the parameters of the intercepted requests, computes the following criteria, for example: the type of "*.docx" file (one of the files of the Microsoft Office® document) which the request wants to work with; the method of working with the file (e.g., a request to open the existing file by sending the flag "OPEN_EXISTING"); the type of operations with the file (e.g., a request to write to the file by sending the flag "GENERIC_WRITE"); file modification parameters (e.g., overwriting the entire file with new data); and a new file name (i.e., different from the old one).

In one example aspect, the analysis module 130 next performs an analysis of the calculated criteria on the basis of rules determining the need to perform a backup copying of the data, based on one or more of the following criteria: (1) depending on the type of the requested file, the analysis module 130 determines a need for its further processing, and whether the integrity of the file is important to the working of the operating system (for example, executable files "*.exe", "*.dll" and so on) or to the user (databases, Microsoft Office documents, email files, photographs and so on); (2) depending on the method of working with the file, the analysis module 130 determines whether working with it can lead to its modification (for example, opening of an existing file, but creation of a new one); (3) depending on the type of operations on the file, the analysis module 130 determines whether working with the file will result in its modification (for example, opening a file for writing, but opening the file read-only); and (4) depending on the data being written, the analysis module 130 determines whether this will lead to its modification or whether data will not be affected (for example, by appending of data to a streaming video file).

If at least one of the rules has been triggered by the calculated criteria (e.g., according to type of file or type of operation on this file, i.e., in the current example this means that the cryptor program will write to the Microsoft Office® document), the analysis module 130 forms and dispatches a request to the backup module 140 for a backup copying of the Microsoft Office® document to the backup database 150 according to one aspect.

In turn, the backup module 140, having received the request from the analysis module 130, performs a backup copying of the Microsoft Office® document being modified by the cryptor program from the data storage module 110 to the backup database 150.

In yet another aspect, the tracking of the file activity of the process of the cryptor program does not end at this point. Rather as the cryptor program accesses a new Microsoft Office® document to change it, the activity tracking module 120 will send the new parameters of the requests of the process of the cryptor program to the analysis module 130 and the analysis module 130 will form and send requests to the backup module 140 for a backup copying of the Microsoft Office® documents being modified. The tracking of the file activity of the process of the cryptor program can continue until the process of the cryptor program is blocked by the detection module 160.

In this aspect, the detection module 160, on the basis of the process parameters of the cryptor program received from the activity tracking module 120 (such as the path to the application running the process, the process descriptor, the log of operations executed by the process, for example) which is modifying the Microsoft Office® document, determines the threat level of the process to the integrity of the document. In one example aspect, the threat level is calculated by analyzing the possibility of irretrievable loss of the content of the document being modified. For example, files may be irretrievably deleted or renamed, the attributes and rights of files may be changed, the content of files may be encrypted without the possibility of decryption on the user's computer due to absence of the corresponding key, and the like. Since the process, not being trusted from the standpoint of the detection module 160 (e.g., a system file signed by a trusted digital signature and the like), is performing operations of writing to file and renaming of file, these actions are taken by the detection module 160 as representing a threat to the data of the document. Furthermore, in one example aspect, the results of the analysis of the received log of operations performed by the process (e.g., numerous requests for writing and renaming of documents in different folders, including temporary ones) indicate that the cryptor program running the process being analyzed is malicious and carries a potential loss to the user's files.

After the detection module 160 has delivered a verdict as to the possibility of irretrievable loss of content of the Microsoft Office® document being modified by the process under analysis, the detection module 160 blocks the operation of this process (e.g., it may delete the process from the memory, halt the execution of the process, place the process in quarantine, and the like), and forms and dispatches a request to the backup module 140 to restore the documents modified by the blocked process from the backup database 150 to the data storage module 110. In this aspect, the backup module 140, receiving the request from the detection module 160, restores the document modified by the cryptor program from the backup database 150 to the data storage module 110. As a result, in one example aspect, none of the documents modified by the cryptor program have been damaged.

Another example of the system and method of restoring modified data is the restoration of an Internet Explorer® process after it has been modified by an injector program. The injector program is malicious software that inserts its data (e.g., code for execution or resources, such as images, for replacement of the original resources) in memory areas of processes working in the system.

In this example, the injector program searches for the Internet Explorer® process, after which it injects its data in the form of advertising banner images into the memory of the process found, substituting these for the original images displayed in the Internet Explorer® browser (e.g., graphic interface elements such as icons or images contained in the pages being displayed). When the injector program accesses the data storage module 110, which is a memory manager of the operating system, with a request to gain access to a memory area of Internet Explorer® in order to make changes, it performs a call for the WinAPI functions "::VirtualAllocEx" and "::WriteProcessMemory". The activity tracking module 120 intercepts these requests and determines their parameters, i.e., which memory area is being accessed, which operations it is preparing to execute on the memory, and so on. The parameters so determined are transmitted by the activity tracking module 120 to the analysis module 130. The activity tracking module 120 also intercepts the process parameters of the injector program, such as the process identifier, the log of operations executed by the process, and so on, and sends these to the detection module 160.

In one example aspect, the analysis module 130, on the basis of the parameters of the intercepted requests of the process to the data storage module 110 as received from the activity tracking module 120, calculates the following criteria, for example:
- to which application does the requested memory area belong (e.g., in the present example, Internet Explorer®);
- the method of working with the memory (e.g., request for writing to memory by sending the flags "MEM_COMMIT", "MEM_RESERVE", "PAGE_EXECUTE_READWRITE"); and
- memory modification parameters (e.g., memory address where the writing will occur, memory address from which the writing will be done, size of the data which will be written, and so on).

In one example aspect, the analysis module 130 may then perform an analysis of the calculated criteria on the basis of rules determining the need to perform a backup data copying:

- depending on the type of process, access to the memory of which was requested, the analysis module 130 determines a need for its further processing and whether the integrity of the file is important to the working of the operating system (e.g., an application of the operating system and so on);
- depending on the method of working with the memory, the analysis module 130 determines whether the working can result in modification of data;
- depending on the type of operations with the memory, the analysis module 130 determines whether the working with the memory will result in its modification;
- depending on the data being written, the analysis module 130 determines whether this will result in modification of the data in the memory of the process, or whether the data will not be affected.

If at least one of the rules has been triggered by the calculated criteria (e.g., according to type of process or type of operation on this process, i.e., in the present example this means that the injector program will write to memory of the Internet Explorer® process), the analysis module 130 forms and dispatches a request to the backup module 140 for a backup copying of the selected memory area of the Internet Explorer process to the backup database 150. The backup module 140, having received the request from the analysis module 130, performs a backup copying of the memory area of the Internet Explorer® process being modified by the injector program from the data storage module 110 to the backup database 150.

In one example aspect, the detection module 160, on the basis of the process parameters of the injector program received from the activity tracking module 120 (e.g., the path to the application running the process, the process descriptor, the log of operations executed by the process, and so on) which is modifying the memory area of Internet Explorer®, determines the threat level of the process to the integrity of the data residing in the memory area being modified by it. The threat level is calculated by analyzing the possibility of irretrievable loss of the content of the memory area of the process being modified. Since the process is performing operations of writing to the memory area of another process, such actions are recognized by the detection module 160 as constituting a threat to the data of the Internet Explorer process. Furthermore, the results of the analysis of the received log of operations performed by the process (many requests for writing to foreign processes) indicate that the injector program running the process under analysis is malicious and carries a potential damage to the user data.

After the detection module 160 has delivered a verdict as to the possibility of irretrievable loss of data residing in the area being modified by the process under analysis, the detection module 160 blocks the working of this process (e.g., it deletes the process from the memory, halts the execution of the process, places the process in quarantine, and the like), and forms and dispatches a request to the backup module 140 to restore data of the process modified by the blocked process from the backup database 150 to the data storage module 110.

In this aspect, the backup module 140, receiving the request from the detection module 160, restores the data modified by the injector program from the backup database 150 to the data storage module 110. As a result, the Internet Explorer® process documents modified by the injector program have not been damaged.

Figure 2:
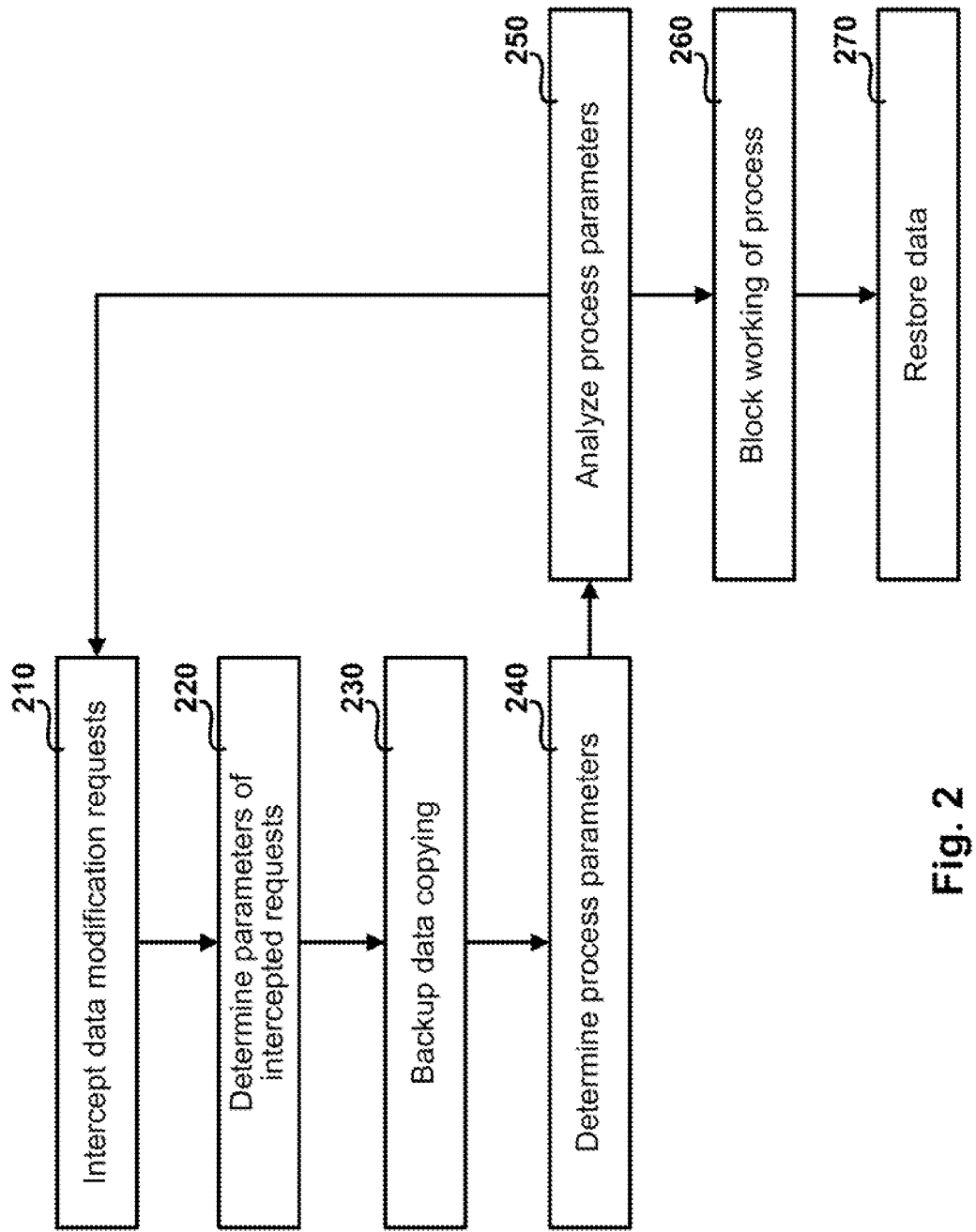
FIG. 2 illustrates a flowchart for an example method of restoring modified data according to an exemplary aspect.

FIG. 2 illustrates a flowchart for an example method of restoring modified data according to an exemplary aspect. As generally shown, the method includes intercepting requests for modification of data (step 210), determining parameters of the intercepted requests (step 220), performing a backup copying of data (step 230), determining the process parameters (step 240), analyzing the process parameters (step 250), blocking the operation of the process (step 260), and restoring the modified data (step 270).

More particularly, according to an exemplary aspect, in step 210, the activity tracking module 120 intercepts at least one request for data modification from the process. As described above, the data whose request for modification has been intercepted can be files and/or memory addresses, for example. Moreover, the data modification requests of the process can be: API functions of the operating system, especially WinAPI functions for Microsoft Windows® and/or operating system kernel functions, for example.

In step 220, the analysis module 130 determines the parameters of the intercepted requests. According to an exemplary aspect, the parameters of the intercepted requests can be a unique data identifier, the method of working with data, the type of operations with data and the parameters of the data modification, for example.

Next, in step 230, backup module 140 performs a backup copying of data to the backup database 150 as a result of the analysis of the parameters determined for the intercepted requests. Analysis of the parameters of the intercepted requests is performed by determining the possibility of data modification (e.g., opening of a file with write privileges, calling of functions which delete a file and the like).

In step 240, the analysis module 130 determines the parameters of the process which sent the request for data modification. The process parameters can be, for example, the path to the application running the process, the process descriptor, and the log of operations performed by the process, for example.

Next, in step 250, the parameters of the process are analyzed using rules in order to determine the threat level of the process to the integrity of the data being modified by it. In one aspect, steps 210 through 250 can be repeated at least until the operation of the process is blocked in step 260.

In one example aspect, the rules for determining the threat level of the process to the integrity of the data being modified can test for the possibility of irretrievable loss of the data being modified by the process, namely, data encryption without the possibility of decryption thereof (e.g., due to inability to obtain the needed decryption key), overwriting of data (i.e., writing of new data in place of old data without the possibility of restoring the latter), and the deleting of data, for example.

In step 260, the operation of the process can be blocked on the basis of the results of the analysis performed in step 250. In one example aspect, the operation of the process can be blocked by deleting the process from the memory, halting the execution of the process, and placing the file running the process in quarantine, for example. Finally, in step 270, the data modified by the process is restored from the backup database 150.

A method for restoring modified data based on the principles outlined above is provided next using as example a restoration of image files (e.g., "*.jpeg", "*.tiff" and the like) after the names of these files have been renamed, and the access privileges to the files have been changed by a ransom program. As described above, the ransom program is a malicious software that restricts access to files such as images, video, and others by renaming them, changing the location in the file system, changing the access privileges, and the like, and which offers the user a chance to restore the altered files by paying for a special program.

According to the example, the ransom program performs a search on the hard disks of an infected computer for image files, after which it changes their location in the file system, and also changes the access privileges, making the files inaccessible to the users who do not have administrator privileges. When the ransom program sends a request for modification of an image file being processed, consisting of the calls for the WinAPI functions "::MoveFile" and "::SetNamedSecurityInfo", the request is intercepted in step 210. After the request has been intercepted, in step 220, the parameters of the request are determined. In this example, the request parameters are the old and new paths to the file, the type of file (structure "SE_OBJECT_TYPE"), information on the security (structure "SECURITY_INFORMATION") and so on. Since the requests are aimed at changing the parameters of files, in step 230, a backup copying is performed of the parameters being changed to the backup database 150. Next, in step 240, the parameters of the process run by the ransom program is determined, such as the process identifier, the log of operations performed by the process, and the like. In step 250, the parameters of the process run by the ransom program are analyzed. Since the process, not being trusted from the standpoint of the detection module 160 carrying out step 250 (e.g., a system file signed by a trusted digital signature and so on), the results of the analysis of the received log of operations performed by the process, such as numerous requests for changing image files in different folders, including temporary ones, indicate that the ransom program running the process being analyzed is malicious and carries a potential loss to the user's files (i.e., the above-described actions are characteristic of malicious programs and not of trusted applications). After the ransom program has been recognized as being malicious, in step 260 there the operation of the ransom program is blocked. For this, the process is halted and deleted from memory, after which the files of the ransom program are placed in quarantine to avoid subsequent repeated calls of the malicious program. After this, in step 270, the file attributes and access privileges that were changed by the ransom program are restored. As a result of the process, none of the image files altered by the ransom program have been damaged.

Figure 3:
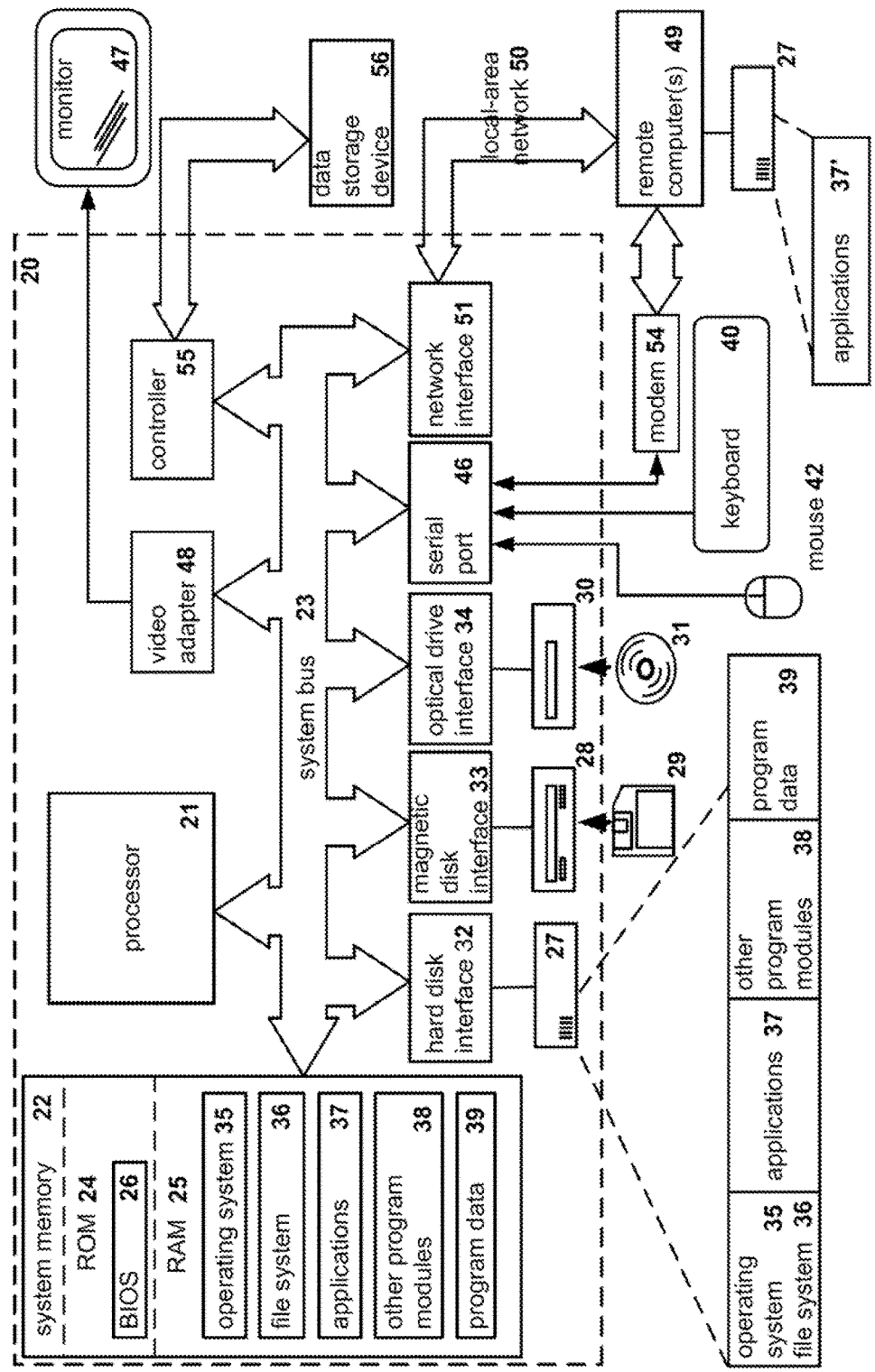
FIG. 3 illustrates an example of a general-purpose computer system, a personal computer or server, on which the disclosed systems and method can be implemented.

FIG. 3 illustrates an example of a general-purpose computer system (which may be a personal computer or a server) on which the disclosed systems and method may be implemented. The computer system 20 includes a central processing unit 21, a system memory 22 and a system bus 23 connecting the various system components, including the memory associated with the central processing unit 21. The system bus 23 is realized like any bus structure known from the prior art, including in turn a bus memory or bus memory controller, a peripheral bus and a local bus, which is able to interact with any other bus architecture. The system memory includes read only memory (ROM) 24 and random-access memory (RAM) 25. The basic input/output system (BIOS) 26 includes the basic procedures ensuring the transfer of information between elements of the personal computer 20, such as those at the time of loading the operating system with the use of the ROM 24.

The personal computer 20, in turn, includes a hard disk 27 for reading and writing of data, a magnetic disk drive 28 for reading and writing on removable magnetic disks 29 and an optical drive 30 for reading and writing on removable optical disks 31, such as CD-ROM, DVD-ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the personal computer 20.

The present disclosure provides the implementation of a system that uses a hard disk 27, a removable magnetic disk 29 and a removable optical disk 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The computer 20 has a file system 36, where the recorded operating system 35 is stored, and also additional program applications 37, other program modules 38 and program data 39. The user is able to enter commands and information into the personal computer 20 by using input devices (keyboard 40, mouse 42). Other input devices (not shown) may be used: microphone, joystick, game controller, scanner, and so on. Such input devices usually plug into the computer system 20 through a serial port 46, which in turn is connected to the system bus, but they can be connected in other ways, for example, with the aid of a parallel port, a game port or a universal serial bus (USB). A monitor 47 or other type of display device is also connected to the system bus 23 across an interface, such as a video adapter 48. In addition to the monitor 47, the personal computer may be equipped with other peripheral output devices (not shown), such as loudspeakers, a printer, and so on.

The personal computer 20 is able to operate in a network environment, using a network connection to one or more remote computers 49. The remote computer (or computers) 49 are also personal computers or servers having the majority or all of the aforementioned elements in describing the nature of a personal computer 20, as shown in FIG. 3. Other devices may also be present in the computer network, such as routers, network stations, peer devices or other network nodes.

Network connections can form a local-area computer network (LAN) 50, such as a wired and/or wireless network, and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the personal computer 20 can employ a modem 54 or other modules for providing communications with a wide-area computer network such as the Internet. The modem 54, which is an internal or external device, is connected to the system bus 23 by a serial port 46. It should be noted that the network connections are only examples and need not depict the exact configuration of the network, i.e., in reality there are other ways of establishing a connection of one computer to another by technical communication modules, such as Bluetooth.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium may comprise RAM, ROM, EEPROM, CD-ROM, Flash memory or other types of electric, magnetic, or optical storage medium, or any other medium that may be used to carry or store desired program code in the form of instructions or data structures and that may be accessed by a processor of a general purpose computer.

In various aspects, the systems and methods described in the present disclosure in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a general purpose computer (such as the one described in greater detail in FIG. 3 above). Accordingly, each module can be realized in a variety of suitable configurations, and should not be limited to any particular implementation exemplified herein.

In the interest of clarity, not all of the routine features of the aspects are disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for restoring modified data, the method comprising:
   intercepting, by a processor of a computer, a request from a program to modify data stored in a data storage;
   determining, prior to the program modifying the data, parameters of the intercepted request that relate to the data to be modified;
   computing criteria based on the determined parameters and analyzing the computed criteria based on at least one rule indicating at least: an integrity of the data to be modified is important to an operating system of the computer or important to a user of the computer, and whether, based on the parameters of the intercepted request, a method of working with the data storage and a type of data operations on the data storage result in modifications of the data;

generating, prior to the program modifying the data, a request to generate a backup copy of the data when the at least one rule is satisfied;

generating and storing, prior to the program modifying the data, a backup copy in the data storage;

analyzing, one or more parameters of a process of the program that relates to the data operations to modify the data; and blocking further operation by the program based on an analysis of the one or more parameters of the process.

2. The method of claim 1, wherein the parameters of the intercepted request comprise at least one of a unique data identifier of the intercepted request, the method of operating with the data storage with respect to the data to be modified, the type of the data operations, and at least one data modification parameters.

3. The method of claim 1, wherein the parameters of the process include at least one of:
a path to an application running the program;
a process descriptor; and
a log of operations executed by the program.

4. The method of claim 1, further comprising:
determining if the data has been modified by a process of a malicious program based on the determined process parameters; and
if the data has been modified by the process of the malicious program, restoring the data using the backup copy of the data after the further operation of the process of the malicious program have been blocked.

5. The method of claim 1, wherein the analyzing of the determined process parameters comprises: determining a threat level of the parameters of the process of the program that modifies the data and blocking the further operation of the process of the program based on the threat level.

6. The method of claim 1, wherein the blocking of the further operation of the process of the program comprises at least one of deleting the process from memory of the device, halting execution of the process, and placing a file running the process in quarantine.

7. The method of claim 1, wherein the rule further comprises a need to backup the data based on a type of the data.

8. A system for restoring modified data on a computer, the system comprising:
a data storage; and
a hardware processor configured to:
intercept a request from a program to modify data stored in the data storage;
determine, prior to the program modifying the data, the parameters of the intercepted request that relate to the data to be modified;
compute criteria based on the determined parameters and analyze the computed criteria based on at least one rule indicating at least: an integrity of the data to be modified is important to an operating system of the computer or important to a user of the computer, and whether, based on the parameters of the intercepted request, a method of working with the data storage and a type of data operations on the data storage result in modifications of the data;
generate, prior to the program modifying the data, a request to generate a backup copy of the data when the at least one rule is satisfied;
generate and store, prior to the program modifying the data, a backup copy in the data storage;
analyze one or more parameters of a process of the program that relates to the data operations to modify the data; and
block further operation by the program based on an analysis of the one or more parameters of the process.

9. The system of claim 8, wherein the parameters of the intercepted request comprise at least one of a unique data identifier of the intercepted request, the method of operating with the data storage with respect to the data to be modified, the type of the data operations, and at least one data modification parameters.

10. The system of claim 8, wherein the parameters of the process include at least one of:
a path to an application running the program;
a process descriptor; and
a log of operations executed by the program.

11. The system of claim 8, wherein the processor is further configured to:
determine if the data has been modified by the process of a malicious program based on the determined process parameters, and if the data has been modified by the process of the malicious program, restore the data using the backup copy of the data after the further operation of the process of the malicious program has been blocked.

12. The system of claim 8, wherein processor is further configured to:
determine a threat level of the process parameters of the process of the program that modify the data, and
block the further operation of the process of the malicious program based on the threat level.

13. The system of claim 8, wherein the processor is further configured to block the further operation of the process of the program by at least one of deleting the process from memory of the device, halting execution of the process, and placing a file running the process in quarantine.

14. The system of claim 8, wherein the rule further comprises a need to backup the data based on a type of the data.

15. A non-transitory computer readable medium storing computer executable instructions for restoring modified data on a computer, including instructions for:
intercepting a request from a program to modify data stored in a data storage;
determining, prior to the program modifying the data, one or more parameters of the intercepted request that relate to the data to be modified;
computing criteria based on the determined parameters and analyzing the computed criteria based on at least one rule indicating at least: an integrity of the data to be modified is important to an operating system of the computer or important to a user of the computer, and whether, based on the parameters of the intercepted request, a method of working with the data storage and a type of data operations on the data storage result in modifications of the data;
generating, prior to the program modifying the data, a request to generate a backup copy of the data when the at least one rule is satisfied;
generating and storing, prior to the program modifying the data, a backup copy in the data storage;
analyzing one or more parameters of a process of the program that relates to the data operations to modify the data; and blocking further operation by the program based on an analysis of the one or more parameters of the process.

16. The non-transitory computer readable medium of claim 15, wherein the parameters of the intercepted request comprise at least one of a unique data identifier of the intercepted request, the method of operating with the data storage with respect to the data to be modified, the type of the data operations, and at least one data modification parameters.

17. The non-transitory computer readable medium of claim 15,
wherein the parameters of the process include at least one of:
   a path to an application running the program;
   a process descriptor; and
   a log of operations executed by the program.

18. The non-transitory computer readable medium of claim 15, further including instructions for:
   determining if the data has been modified by the process of the malicious program based on the determined process parameters; and
   if the data has been modified by the process of the malicious program, restoring the data using the backup copy of the data after the further operation of the process of the malicious program has been blocked.

19. The non-transitory computer readable medium of claim 15, wherein the instructions for analyzing the determined process parameters further comprise determining a threat level of the process parameters of the process of the program to modify the data and blocking the further operation of the process of the program based on the threat level.

20. The non-transitory computer readable medium of claim 15, wherein the instructions for blocking the further operation of the process of the program comprise at least one of deleting the process from memory of the device, halting execution of the process, and placing a file running the process in quarantine.

* * * * *